June 14, 1927.
H. MARCUS
BIRD CAGE
Filed Nov. 20, 1926
1,632,380
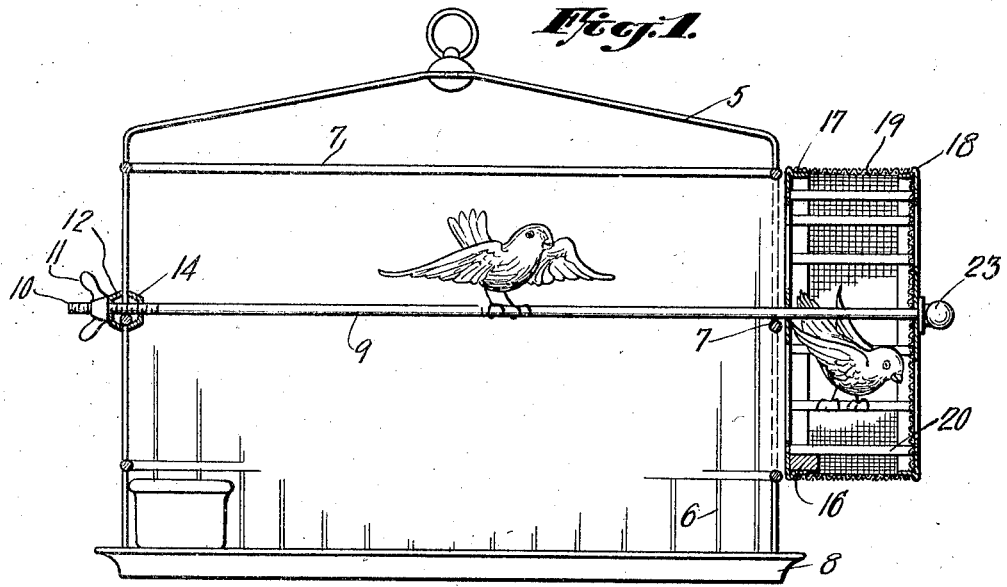
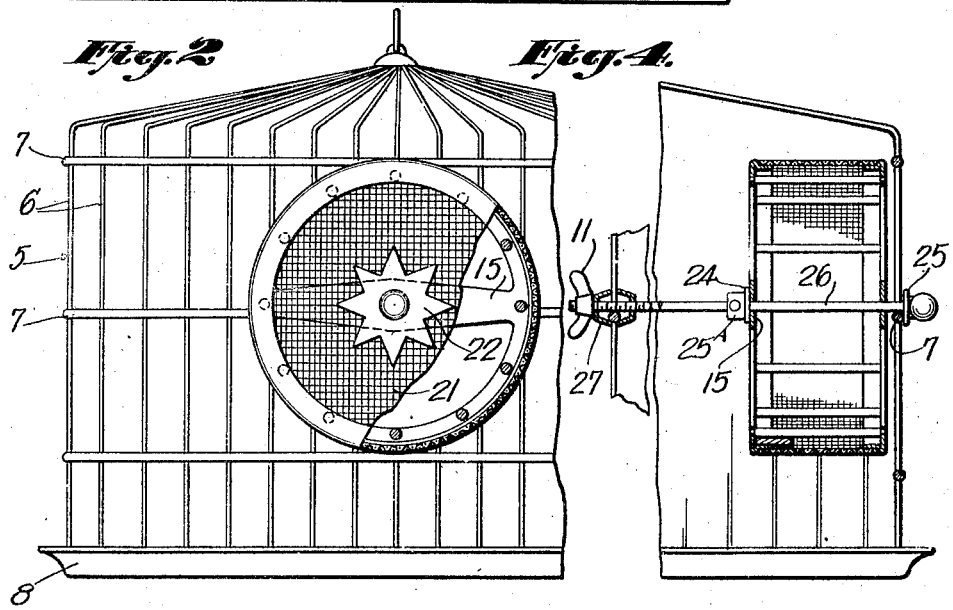
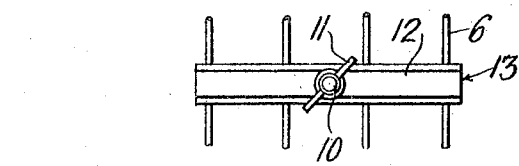
Inventor
HASCAL MARCUS.
By His Attorney
Richard Owen Patented June 14, 1927.

1,632,380

UNITED STATES PATENT OFFICE.

HASCAL MARCUS, OF BROOKLYN, NEW YORK.

BIRD CAGE.

Application filed November 20, 1926. Serial No. 149,621.

This invention relates to bird cages and in particular to one to which there is adapted to be attached, a bird exercising wheel.

A particular object of the invention is to provide an exercising wheel which may be attached in a cage already made, either on the inside or the outside thereof and access to which can be gained with a minimum of danger to the bird.

A still further important object of the invention is to provide in a bird exercising wheel, a weight which will tend to keep the exercise wheel at a certain position when it normally comes to rest so that the cross spoke of the wheel will not interfere in any way with the passage of the bird from the cage to the wheel or vice versa.

To enable others skilled in the art to fully comprehend the underlying features of my invention that they may embody the same in the various modifications in structure and relation contemplated, a drawing depicting a preferred form has been annexed as a part of this disclosure and in such drawing, similar reference characters denote corresponding parts throughout all the views, of which, Figure 1 is a view in front elevation of a bird cage, the bars thereof being broken away to illustrate the combination therewith of my improved bird exercise wheel.

Figure 2 is a view in end elevation of the cage and bird wheel, the latter being broken away to show the interior construction thereof.

Figure 3 is a view in end elevation of a fragmentary portion of the cage showing the shaft locking clamp used to hold the wheel in position on the cage, and Figure 4 is a view showing both ends of a cage, the same illustrating how the bird exercise wheel may be disposed within the interior of the cage, if desired.

Referring to the drawings in detail, 5 indicates the usual bird cage construction, employing vertically disposed bars 6 and horizontal bracing bars 7, the cage being supported in a suitable tray 8.

In order to provide the bird exercise wheel in conjunction with the cage, I have provided a holding bar 9, which may be inserted at one side of the cage between the bars 6 thereof and disposed so that it rests on the horizontally disposed bars 7, at the opposite sides or ends of the cage, it being of course understood that the bar 9 extends to the opposite end of the cage, as at 10 and is threaded to receive the locking nut 11 which holds in position, against the vertical bars 6, the outer portions 12 of a clamping member 13. The inner member 14 of the clamp is arranged on the threaded end of the bar 9 so that it will press against the inside of the vertical bars 6 when the rod 9 is placed in position, it, of course, being understood that this clamping piece 14 may be adjustable longitudinally of the bar 9 to properly position the bird wheel relatively to the sides of the cage.

Of course, I am aware that bird cages have been provided heretofore with bird exercising wheels and in many instances, the objects of the inventions have been to simply provide a bird exercising wheel in conjunction with a cage, but these wheels have been found unsatisfactory due to their construction and their tendency to rotate whereby the bird is injured in passage from the wheel to the interior of the cage.

It is the object of my invention, therefore, to provide this bird wheel on the side thereof adjacent the cage with a single connecting strap 15, which forms a journal for the wheel with the shaft or rod 9. This strap 15 is disposed in a horizontal position normally adjacent one of the horizontally disposed rods 7 upon which the rod 9 rests. In the revolving movement of the bird wheel, the danger has always been the catching of the bird in the spokes of the bird wheel and in the horizontally disposed bars 7 of the cage, and it can be readily seen that should the bird leave the bird wheel and try to enter the cage when the wheel was revolving at a fairly rapid speed, any cross bar or brace such as the strap 15 might squeeze the bird between the horizontal bars of the cage 7.

In order to eliminate this condition, I have provided the bird wheel with a weight 16 of any suitable material, such as lead, in the bottom thereof, so that a tendency to come to rest as soon as the bird has left the wheel, will be imparted to the wheel, thereby bringing the strap 15 into horizontal position and preventing its catching the bird between it and any one of the horizontal bars 7 of the cage.

In order to further eliminate the probability of injury to the bird, I have provided a bird wheel which is constructed of an inner sheet metal rim 17, from which the strap 15, before mentioned, is formed, the rim 17 being duplicated at the opposite side of the wheel in the rim 18, also made of solid material, such as tin or other suitable metal, the rims being joined by the wire mesh 19. The rims of tin or other metal 17 and 18 are joined by the bars 20, upon which the bird may rest and between which he may jump to revolve the exercise wheel. The outer wall of the wheel is, of course, closed by a wire mesh wall 21 which, at its center is provided with the solid metal member 22 which may be of any suitable design, and through which passes the end of the rod 9, which is locked therein through the medium of the locking nut 23, which may be in any suitable form, such as spherical, as shown in Figures 1 and 4.

It is evident, therefore, that I have provided an improved bird cage and exercise wheel, the latter of which may be applied to the cage without materially altering the construction thereof, it being simply necessary to clip out the vertical wires 6 of the cage adjacent that portion of the bird wheel to which the bird is to have access, the positioning of the wheel being such that the bird, of course, cannot escape between the wheel and the cage.

It will also be seen that the position of the wing nut 11 of the threaded end 10 of the bar 9 will securely hold, together with the clamps 12 and 14, the bird wheel in position adjacent one end of the cage and will allow its free revolving movement on the end of the rod 9 between the cage and the locking nut 23.

In order to provide for the placing of the wheel on the interior of the cage, as shown in Figure 4, I provide a plurality of washers 24 and 25, the former of which is placed next to the strap 15 of the bird wheel and is held in position through the medium of the locking sleeve or collar 25^A, which is secured in any suitable manner to the rod 26 and maintains the bird wheel in position adjacent one end of the cage, and allows it free revolving movement about the rod 26. The washer 25 is large enough to engage the cross or horizontal bar 7 of the cage and in conjunction with the locking nut 11 and clamp 27 at the opposite end of the rod 26, locks the bird wheel in position within the cage.

It is evident, therefore, that I have provided a bird wheel which can be used in connection with a bird cage and can be positioned exteriorly or interiorly of the bird cage and which can be supported by the horizontally disposed bars 7 of the cage so that the same can have free revolving movement on its supporting rod and will allow the bird to have the exercise necessary.

It is also evident, that I have provided an exercise wheel of improved construction which incorporating, as it does, walls of wire mesh, which prevent injury to the bird during the revolving movement of the wheel which has heretofore been the case when the bird wheel was made of bar material.

A still further advantage in the use of my improved bird cage is that, without materially altering the cage as manufactured, the bird wheel may be applied thereto or to any other standard construction of cage with a minimum of time and labor and can be removed therefrom when desired.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. A bird exercising device for attachment to bird cages comprising a rod threaded at one end, a clamp at said end for engagement with the cage bars, a lock for the end of the rod for securing said clamp, a revolvable wheel carried at the opposite end of said rod, and said rod constituting a bird perch within the cage.

2. The combination with a bird cage of a bird wheel, comprising a cylindrical wheel cage member, a strap across the open side of the wheel, a rod upon which the wheel cage is revolvably mounted, means for holding the cage on the rod, clamps on the rod for adjustably attaching the same to the main bird cage, and a weight in the wheel for causing the strap to be positioned in line with a part of the cage construction when the wheel comes to rest whereby injury to the bird will be prevented.

In testimony whereof I affix my signature.

HASCAL MARCUS. [L. S.]